US005800256A

United States Patent [19]
Bermudez

[11] Patent Number: 5,800,256
[45] Date of Patent: Sep. 1, 1998

[54] TOOL AND METHOD FOR PICKING CRABS

[76] Inventor: May Bermudez, 10100 Fleming Ave., Bethesda, Md. 20814

[21] Appl. No.: 643,235

[22] Filed: May 2, 1996

[51] Int. Cl.$^6$ ........................................... A22C 29/04
[52] U.S. Cl. ............................ 452/6; 294/99.2; 606/210
[58] Field of Search ..................... 452/6–17; 294/99.2; 606/210

[56] References Cited

U.S. PATENT DOCUMENTS

| | | |
|---|---|---|
| 272,118 | 2/1883 | Brazeau . |
| 1,033,942 | 7/1912 | Ruggles . |
| 1,081,830 | 12/1913 | Holloway . |
| 1,197,801 | 9/1916 | Curry . |
| 3,304,111 | 2/1967 | Kauh et al. . |
| 3,889,995 | 6/1975 | Lin . |
| 4,172,306 | 10/1979 | Hopkins . |
| 4,271,563 | 6/1981 | Theuman . |
| 4,524,490 | 6/1985 | Newville . |
| 4,716,627 | 1/1988 | Scott, Jr. ........................ 452/6 |
| 4,967,446 | 11/1990 | Padel ............................ 452/6 |
| 4,976,718 | 12/1990 | Daniell . |
| 5,403,230 | 4/1995 | Capriglione, Sr. . |

Primary Examiner—Willis Little
Attorney, Agent, or Firm—Jones, Tullar & Cooper, P.C.

[57] ABSTRACT

A tool and method for picking crab which includes a long, narrow and strong forceps that is specially adapted to be inserted into cavities within the shell for tearing the shell and picking out the crab meat. The crab picking tool is preferably formed from two halves which are joined at one end to form a large tweezer-like forceps. The tool has a handle portion and a pincer portion. In the preferred embodiment, the end of the pincer portion is made up of two roughly spoon shaped tips of a selected width. The tips are preferably textured with ridges or some other surface pattern to enhance the holding power of the tool. The pincer portion is much narrower, approximately one eighth of an inch, and is thus specially adapted to pick crabs using the method of the present invention. In use, the tool is inserted into the subchambers of the crab shell to remove crab meat. The tool may be inserted into the narrow outer leg openings in such a manner that one of the jaws is in the crab shell and one of the jaws is outside the crab shell. The crab body is inverted, and by closing the tool and twisting the tool it is possible to cleanly rip open the shell without contaminating the meat with bits of shell, since any bits of shell fall downwardly, away from the meat. It is also possible to open up the difficult sections of the claw using this method. The tool can be used to pull crab meat through the outwardly facing narrow leg holes or through the inwardly facing opening of an open crab body.

13 Claims, 7 Drawing Sheets

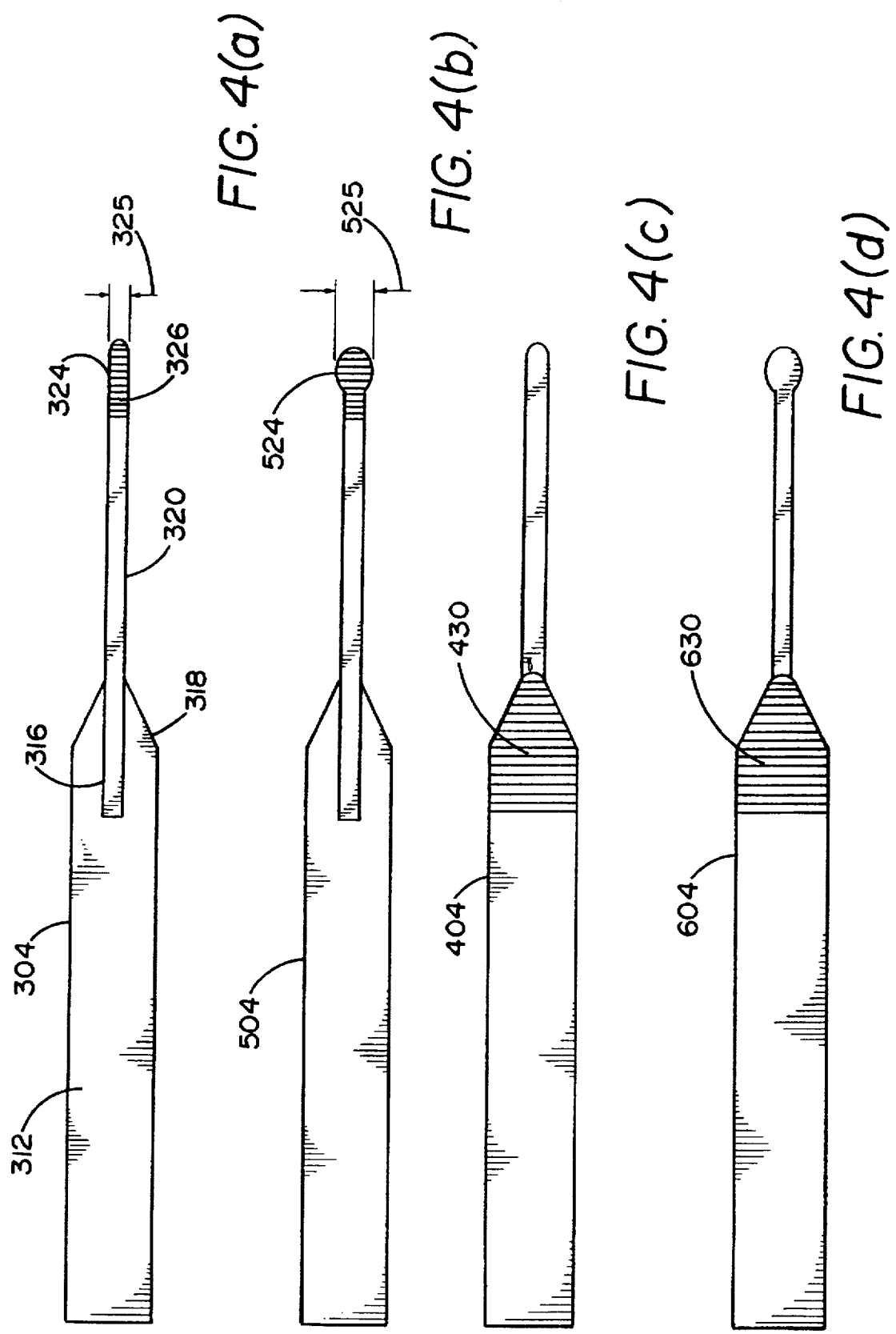

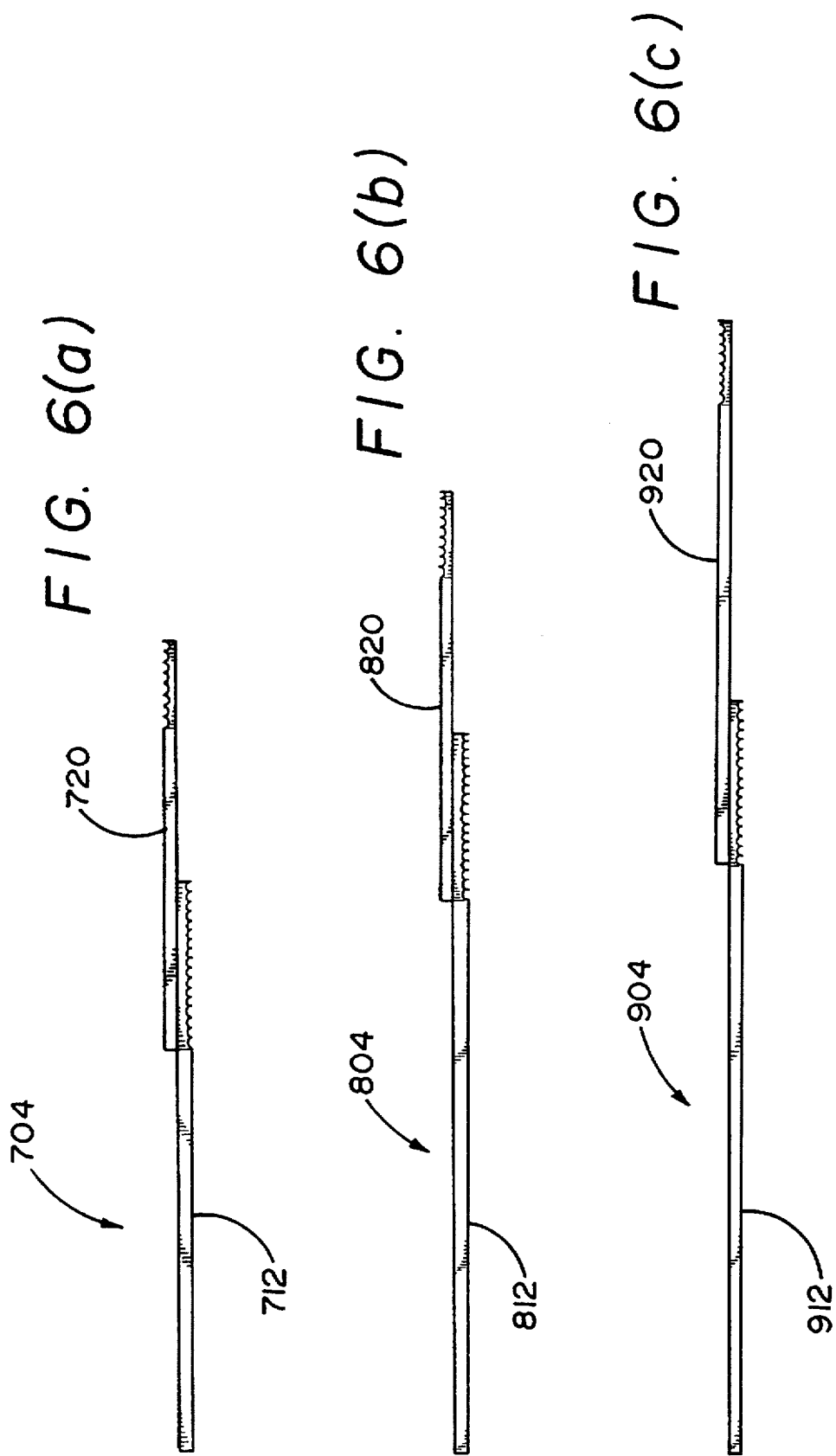

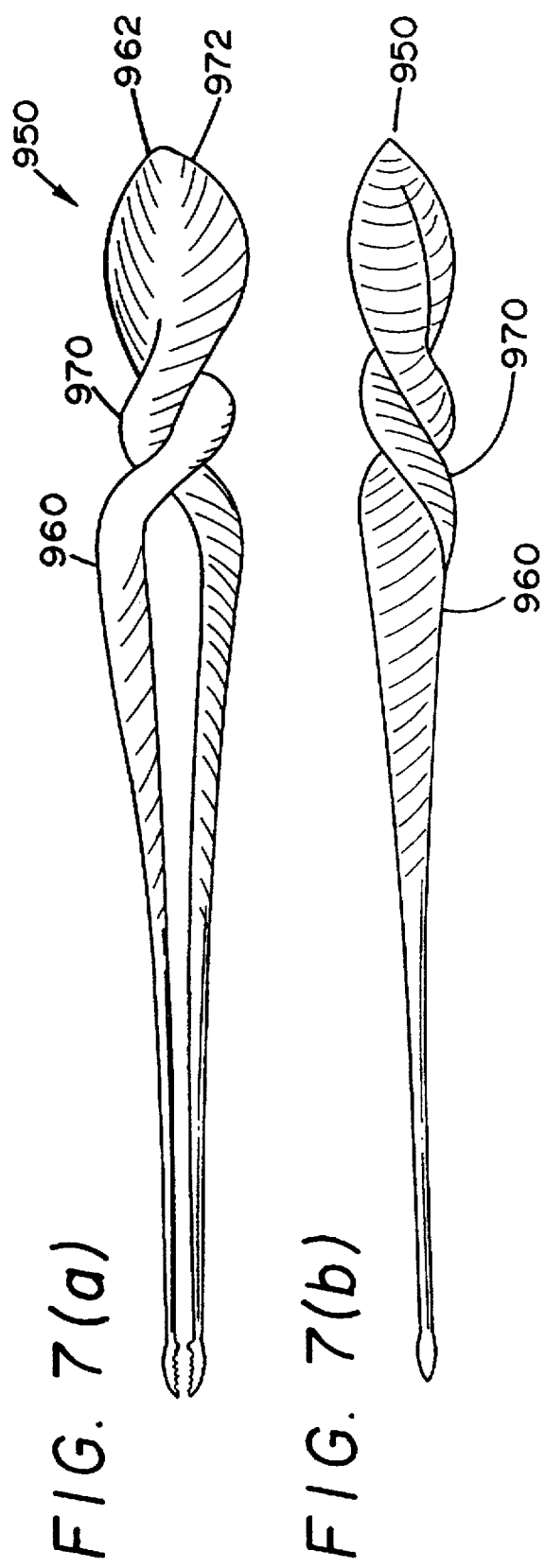

TOOL AND METHOD FOR PICKING CRABS

BACKGROUND OF THE INVENTION

The present invention pertains, in general, to a tool and method for efficiently removing crab meat from crabs.

For those who enjoy eating crabs, one problem which must be overcome is picking the meat from the crab. A number of crabs are considered delicacies. In particular, the blue crab and the stone crab are prized for their succulent meat. In scientific nomenclature, crabs are crustaceans of the order of decapoda, sub order reptantia, and the section brachyura. These are the animals classified as "true crabs." The blue crab (*Callinectes sapidus*) is the most popular delicacy in this group, since it is the common crab of the Atlantic coastal area of the United States.

Crabs are usually found with a hard brittle carapace, or shell, which makes retrieval of clean lumps of meat difficult. This, in part, explains the premium prices which "soft shell" crabs command in the market place.

In the past, it has normally been necessary to use two or more tools in picking crabs. Tools such as a wooden mallet, a sharp knife, a nut cracker, shears and in some cases, a sharp pick have all been used. These implements are difficult and dangerous to use and so many gourmets feel uncomfortable about giving such tools to children or other novices. In addition, picking the crab meat using the mallet and the knife frequently result in broken or shattered bits of shell which contaminate the picked crab meat. Finally, broken jagged edges of shell generated by the use of the mallet and the knife can be hazardous and have resulted in injuries to the fingers and hands of crab pickers.

In the method of the prior art for picking the crab meat from crabs, one begins with removal of the legs and claws. Next, with fingers, an apron on the underside of the body is pulled off and discarded. With the body in both hands, the thumb is inserted under the shell, by an apron hinge, and the top shell is pulled from the body. A spoon may be used to scrape soft red roe or grayish green liver from within the top shell, if desired, then the top shell may be discarded. The body may also include roe or liver in a central cavity, this may be removed and saved and the finger-like gills are then removed and discarded. The body of the crab is then cut or broken into two parts. The knife and mallet are customarily used to cut and smash the portions of the shell sections or subchambers of the body so that white crab meat can be picked from within. Since the knife and mallet are not well suited to working with the smaller parts of the crab, such as the legs, the legs are customarily discarded.

The method of the prior art does not usually result in retrieval of all the crab meat from the crab body, and the legs and other parts of the crab are customarily discarded, so a considerable amount of waste is generated. In addition, the crab meat which is picked almost always includes a significant amount of the smaller fragments of contaminating shell; these bits of shell diminish the value and quality of the meat and can be hazardous to chew and swallow. Finally, the person picking the crab is likely to get at least a few painful cuts and scratches. The cuts and scratches may be rendered more painful by the presence of various condiments such as Old Bay Spice (TM).

These methods have been documented in well known cookbooks such as:

1) *Larousse Gastronomique*, Crown Publishers, Inc., Edited by Jenifer Harvey Lang, 1988 (english), pp. 319–21; and 2) *The New Good Housekeeping Cookbook*, Hearst Books, Edited by Mildred Ying, 1986, pp. 243–4.

These methods, along with their drawbacks, represent the state of the (prior) art. Accordingly, there has long been a need for a safer, improved method for efficiently picking clean crab meat and for a tool which can be used in that method.

SUMMARY OF THE INVENTION

It is an object of the invention to provide a method for picking crabs which does not contaminate the meat with bits of shell and which permits the meat to be picked without injury to the user. It is a further object of the present invention to provide a specially adapted tool for picking and eating blue crabs (and similar crustaceans), wherein the tool is adapted for use as a forceps with a pair of biased, normally open, parallel jaws which can be pinched to close. The jaws are preferably shaped as small spoons having a maximum width of approximately one quarter inch, and thus are specially adapted to fit within the crab's narrow outer leg opening. The small jaw edges are preferably serrated for grasping and tearing the crab shell and picking the meat.

The present invention is directed to a tool and method for picking crab which uses a long, narrow and strong forceps that is specially adapted to be inserted into cavities within the shell for tearing the shell and picking out the crab meat. The crab picking tool is preferably formed from two halves, a left portion and a right portion, which are joined at one end to form a large tweezer-like forceps. The tool has wide handles and narrow pincers. In the preferred embodiment, the end of the pincers are made up of two roughly spoon-shaped jaws of a selected width. The jaws are preferably roughened with ridges or some other surface pattern to enhance the holding power of the tool. The width of the handle is approximately five eighths of an inch and its length is at least three inches, for ease of grasping by the user. The pincer is much narrower, approximately one eighth of an inch, and has a length of at least one and one half inches. The pincer is thus specially adapted to pick crabs using the method of the present invention.

In use, the tool is inserted into the sections or subchambers of the crab shell to remove the white crab meat. The tool may be inserted into the narrow outer leg openings with one of the jaws in the subchamber shell and one of the jaws outside the subchamber shell. The crab body is inverted and then, by closing the jaws and twisting the tool it is possible to cleanly rip open the subchamber shell without contaminating the meat with bits of shell, since any bits of shell fall downwardly, away from the meat. The lumps of crab meat may then be picked out of the crab's body through the ripped opening.

It is also possible to open up the difficult sections of the claw using this method. Using this technique, it is possible to pick virtually all of the crab meat from the crab body and claws, without contaminating that meat with bits of shell.

In a variation on the method of the present invention, after the crab's legs are removed (i.e. torn off), both jaws of the tool are inserted into a narrow outwardly facing leg hole, whereby a lump of crab meat may be grasped so that it may be withdrawn through the narrow outwardly facing leg hole in one piece.

BRIEF DESCRIPTION OF THE DRAWINGS

The foregoing and additional objects, features and advantages of the invention will become apparent those of skill in the art from the following detailed description of the preferred embodiment, taken with the accompanying drawings, in which:

FIGS. 4a, 4b, 4c, and 4d illustrate parts of two embodiments of the present invention; FIGS. 4a and 4b show left halves viewed from the inside and FIGS. 4c and 4d show right halves viewed from the outside.

FIGS. 6a, 6b and 6c each illustrate a top view of three sizes for one half of the crab picking tool of the present invention.

FIGS. 7a and 7b illustrate two views of an alternative embodiment of the present invention where an ornamental serpentine pattern is fabricated into the handle part of the tool.

DETAILED DESCRIPTION OF THE DRAWINGS

Figure 1:
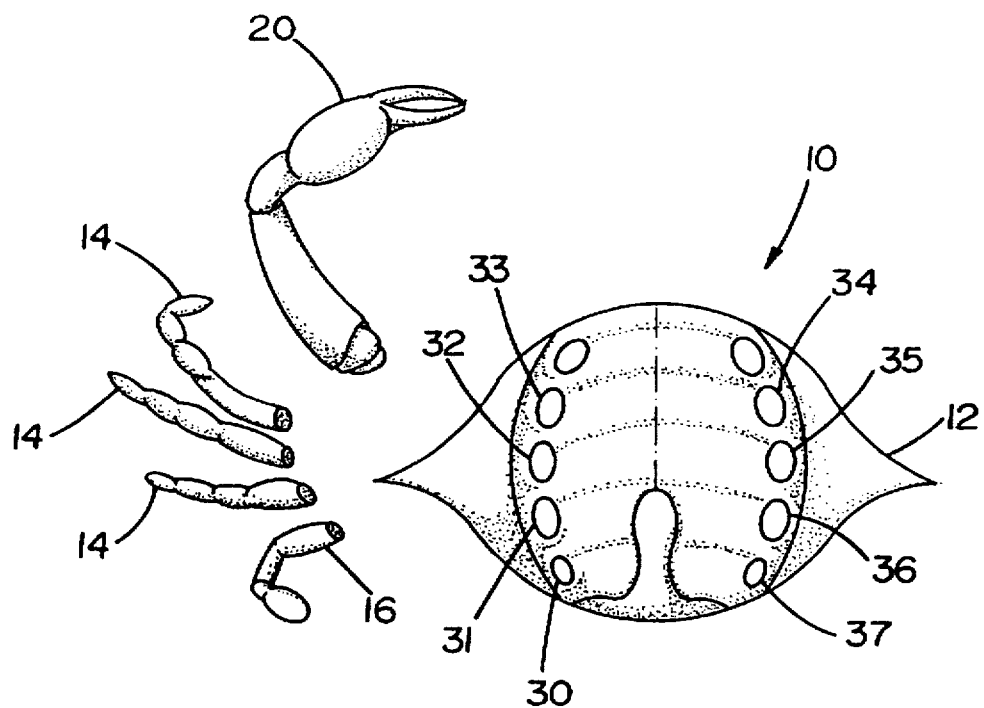
FIG. 1 illustrates a blue crab body in the upside down position with the legs and claws removed.

Turning now to a more detailed description of the present invention, there is illustrated in FIG. 1 an object of epicurean desire, the blue crab 10. This illustrates a blue crab in an inverted position viewing the carapace 12 from the bottom. The legs 14 and back fin 16 have been removed, leaving outwardly facing narrow leg holes 30, 31, 32, 33, 34, 35, 36 and 37. The leg holes 30-37 are approximately one quarter of an inch in diameter (for an adult blue crab). Each leg hole 30-37 is an opening into a subchamber within a body half 50-57. Each subchamber 50-57 is filled with white crab meat. Each subchamber is separated and enclosed by shell partition walls 60. The depth of a subchamber e.g. 56, as measured from a leg hole entrance 36' to an interior partition 66 of subchamber 56 is approximately one inch.

Claw 20 includes a first claw portion 74 and a second claw portion 76; each is filled with meat. Once the claw has been removed from the crab, the second claw portion 76 has a claw joint opening 78.

Figure 3:
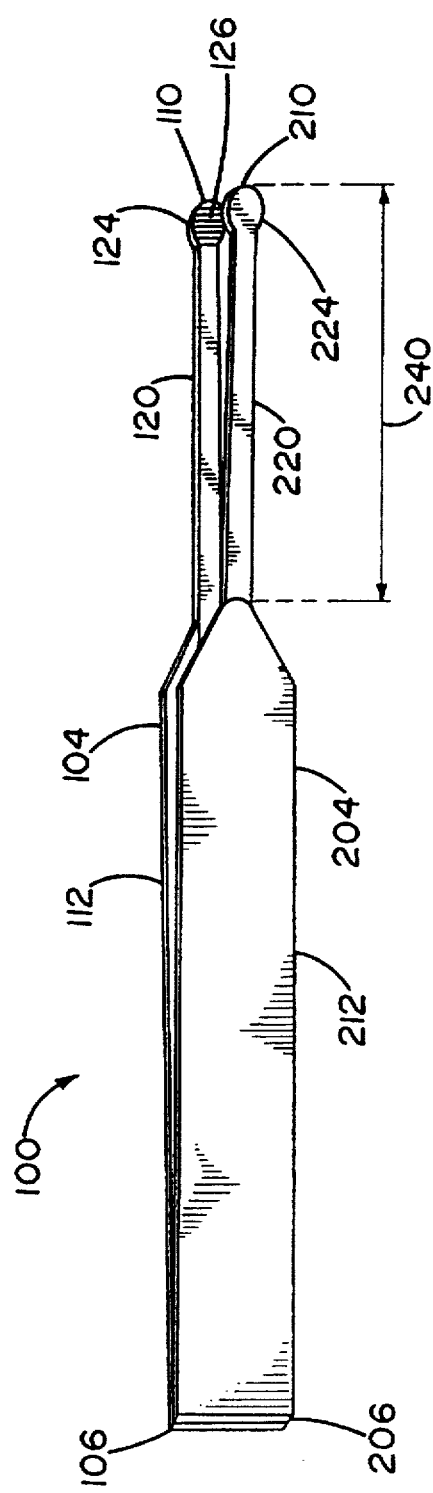
FIG. 3 is a perspective view which illustrates the crab picking tool of the present invention in its normal, biased open position.

Turning now to FIG. 3, a crab picking forceps tool 100 is illustrated in perspective. The tool is in its normal, biased open position. The forceps tool includes a left half portion 104, having a handle end 106 and a jaw end 110 and includes a long handle 112. Handle 112 is preferably at least three inches long and is about five eighths of an inch in width. The left portion 104 also includes a pincer 120 which is preferably at least one and one half inches long and approximately one eighth inch in width. The pincer 120 is terminated in a left jaw 124 which has an inside surface 126. This left portion is one half of the tool 100.

There is also a right half portion 204, having a handle end 206 and a jaw end 210. The right portion 204 is affixed by weld or bond to the left portion 104 at the handle ends 106, 206. The right portion 204 preferably has the same widths and lengths as the left portion 104 and so, as shown in FIG. 3, the right portion has a handle 212 with a length of at least three inches and a width of five eighths of an inch. It also has a pincer 220 having a length 240 of at least one and one half inches and a width of one eighth inch. Pincer 220 terminates in a right jaw 224; the right jaw has an inside surface (not shown) which opposes the inside surface of the left jaw 126. Left jaw 124 and right jaw 224 are roughened on the opposing inside surfaces.

In the preferred embodiment, left jaw 124 and right jaw 224 are spoon shaped, and the roughened opposing inside surfaces have ridges, checking or some other inlaid pattern which will serve to enhance the grasping and holding power of the jaws. The width of the jaws is preferably approximately one quarter inch; this corresponds to the approximate size of a narrow leg opening 30-37. Jaw width is defined here as the dimension which runs perpendicular to the long axis of the pincer, at the center of the jaw 124. The jaw is preferably wider than the rest of the pincer, but not as wide as the handle, as is illustrated in FIG. 3.

Figure 2:
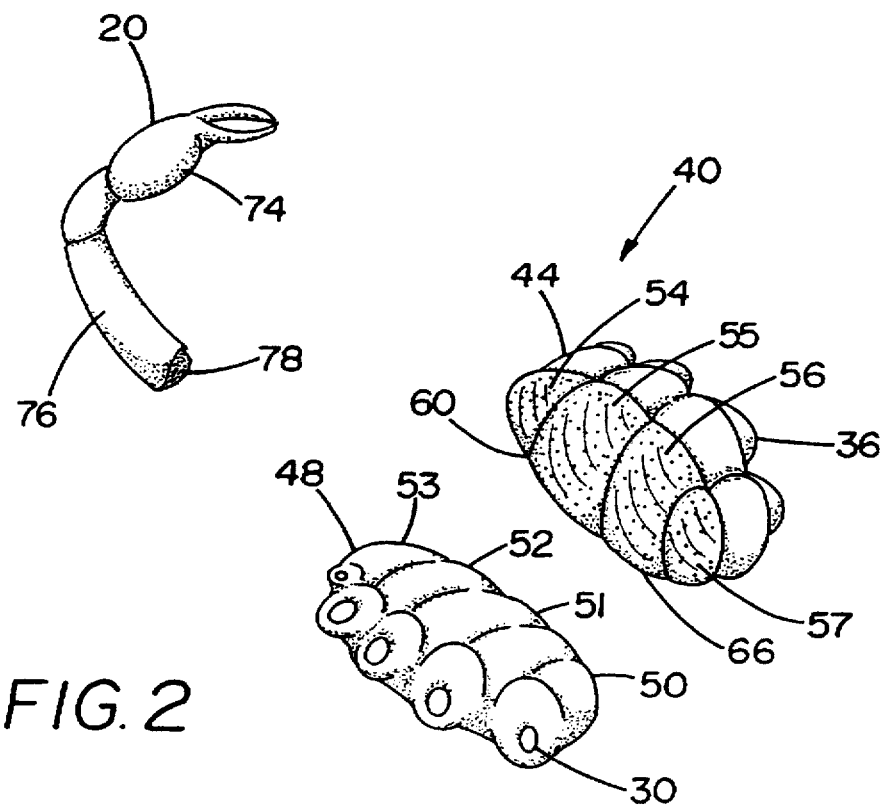
FIG. 2 is a perspective view which illustrates two halves of the crab body with the carapace and apron removed and a claw which has been removed.

The size of these jaws is critical to the intended use of the tool. The width is chosen to optimize the holding power of the jaws while still allowing the jaw to be inserted into a leg opening 30. The pincers 120, 220 must be long enough to span the depth of a subchamber (i.e. from leg hole entrance 36' to interior partition 66, as shown in FIG. 2); this is why the pincer length 240 is preferably at least one and one half inches.

Turning now to FIGS. 4a–4d, these illustrate parts of two embodiments of the present invention. FIG. 4a shows left portion 304 viewed from the inside. This left portion is adapted for joining with right portion 404 and includes a pincer 320 which terminates in a left jaw 324. This jaw 324 is not spoon shaped; it is straight sided and has substantially the same width 325 as the remainder of the pincer portion, approximately one eighth inch. An inside surface 326 of left jaw 324 is preferably roughened or checked, for enhanced gripping power. The pincer 320 and handle 312 are joined in a joint 316 at a mid-point tapered region 318 of the handle. The pincer and handle may be molded or forged as a unitary piece (with an integral, molded or forged joint) or may be welded or bonded together with a joint at the mid point. For purposes of nomenclature, the mid-point is defined as the location of a joint which rigidly connects the handle to the pincer.

The pincer must be stiff and strong enough to tear open a crab shell; it is preferably made from aluminum, stainless steel, or some other metal. The handle 312 can be made from those materials or may be fabricated from wood, plastic or fiberglass reinforced plastic, and bonded at the joint 316 to the pincer 320. In the preferred embodiment, the handle and pincer are fabricated as a unitary piece from stainless steel, and the left and right portions are spot welded together to form a finished tool.

FIG. 4b shows left portion 504 viewed from the inside. Left portion 504 has a spoon shaped jaw 524 which has a width 525 that is preferably one quarter inch. This left portion is adapted for joining with right portion 604. FIG. 4c shows right portion 404 viewed from the outside. This right portion is adapted for joining with left portion 304 and includes a roughened gripping surface 430. This gripping surface is preferably etched, carved, knurled or checked, for enhanced manual gripping and control of the tool. FIG. 4d shows right portion 604 viewed from the outside. This right portion is adapted for joining with left portion 504 and is substantially the same as the right portion 204 as shown in FIG. 3, except that it also includes a textured gripping surface 630 for enhanced manual gripping and control of the tool.

Figure 5:
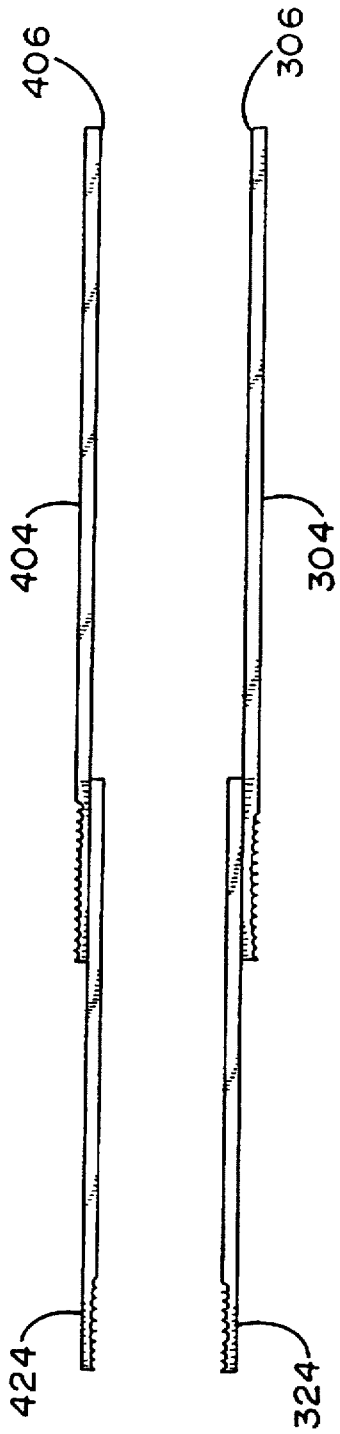
FIG. 5 illustrates a top view of the left and right halves before being joined to form the crab picking forceps tool of the present invention.

FIG. 5 shows a top view of left portion 304 and right portion 404. These are joined at the handle ends 306 and 406 to form the crab picking forceps tool of the present invention. The ends may be joined by welding or bonding, using epoxy or some other cement. The method of joining the ends is necessarily dependant on the selection of materials for the handle ends 306, 406. The ends must be joined in a manner which results in a tool which is normally biased with the jaws apart by a chosen distance. The jaws should be biased with the opposing jaw inside surfaces separated by a distance in the range from one eighth of an inch to one quarter of an inch.

FIGS. 6a–6c show a top view of three sizes for a right half portion of the crab picking tool of the present invention. A small right portion 704 has a handle 712 with a length of at least three inches and a width of five eighths of an inch. It also has a pincer 820 having a length of at least one and one half inches and a width of one eighth inch. This embodiment is most portable and is suitable for people with smaller hands, such as children. A medium-sized right portion 804 has a handle 812 with a length of four and one half inches and a width of five eighths of an inch. It also has a pincer 820 having a length of two and one half inches and a width of one eighth inch. A larger-sized right portion 904 has a handle 912 with a length of four and three quarter inches and a width of five eighths of an inch. It also has a pincer 920 having a length of three and one half inches and a width of one eighth inch.

FIG. 7 illustrates two views, of an alternative embodiment 950 of the present invention. This includes an ornamental serpentine pattern which is fabricated into left and right handles of the tool. The left handle 960 is fabricated as a decaying spiral and has a serpentine handle end 962. The right handle 970 is also fabricated as a complementary decaying spiral and has a second serpentine handle end 972. The handles 960, 970 are intertwined in a serpentine pattern, and the right handle is affixed to the left handle at the serpentine handle ends 962 and 972.

Figure 8:
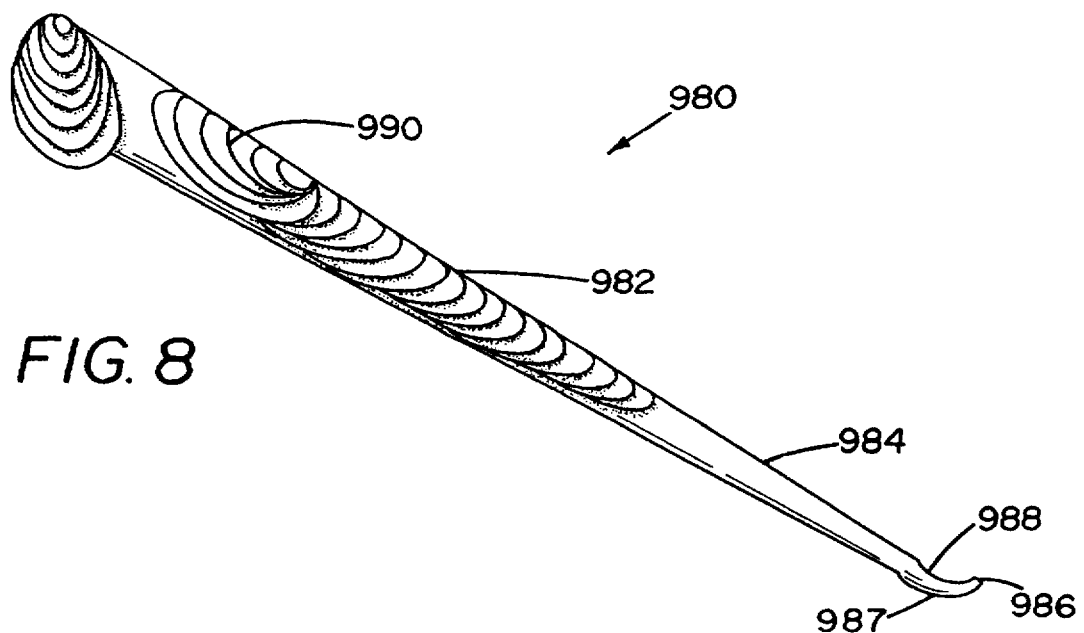
FIG. 8 shows a view of an alternate embodiment of the crab picking tool of the present invention.

FIG. 8 illustrates an alternative embodiment of the tool 980, viewed from one side. A tapered handle 982 is terminated in a tapered pincer 984, which is terminated in a curved jaw 986. The curved jaw 986 has an outer arcuate edge 987 of a first radius and a inner arcuate edge 988 of a second, smaller radius. This tool 980 is also etched or engraved with grooves 990 in an ornamental design. The grooves 990 permit the user to grasp the tool with greater control.

Figure 10A:
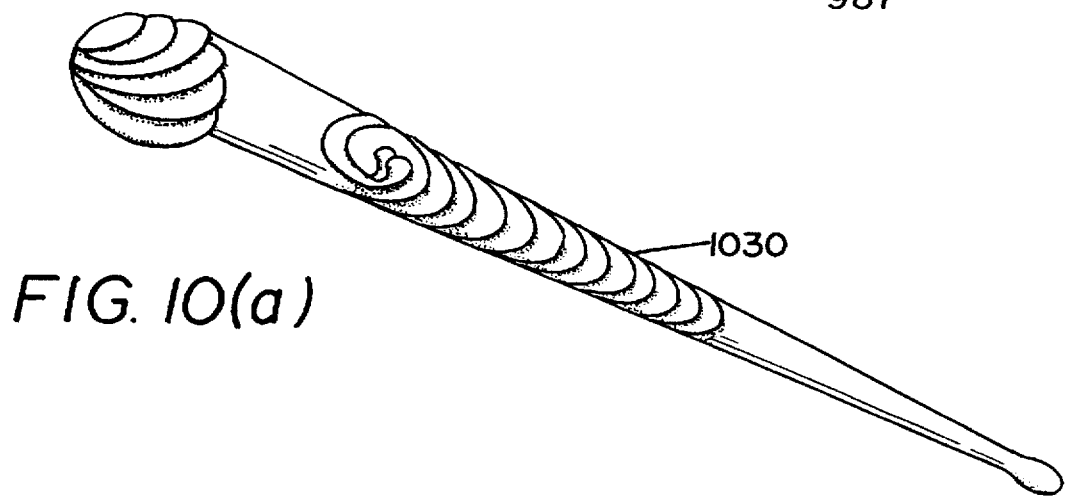
FIGS. 10a and 10b illustrate two ornamental designs for the handle portion of the tool.
Figure 10B:
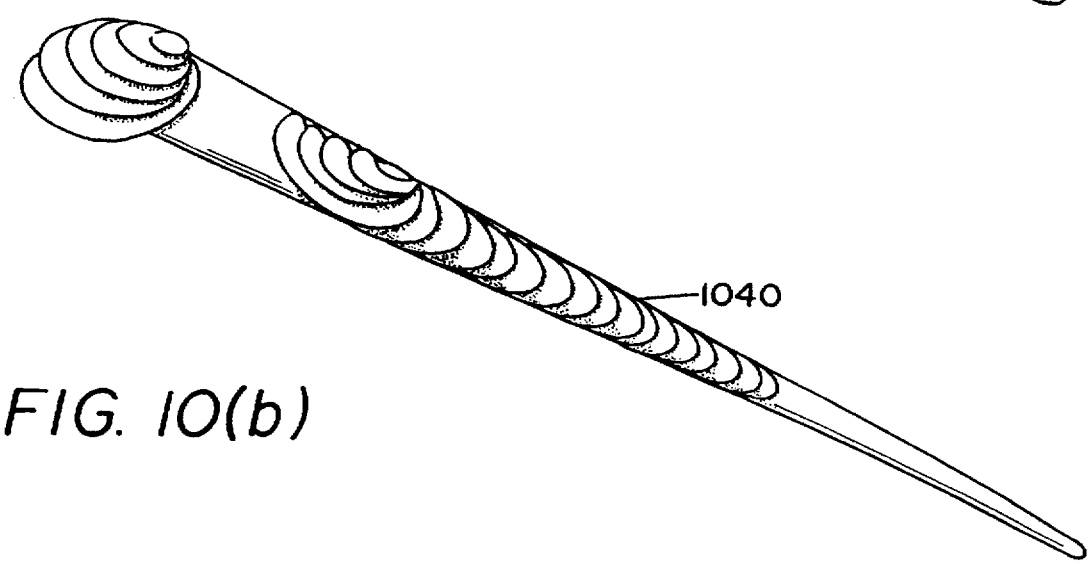
Figure 9A:
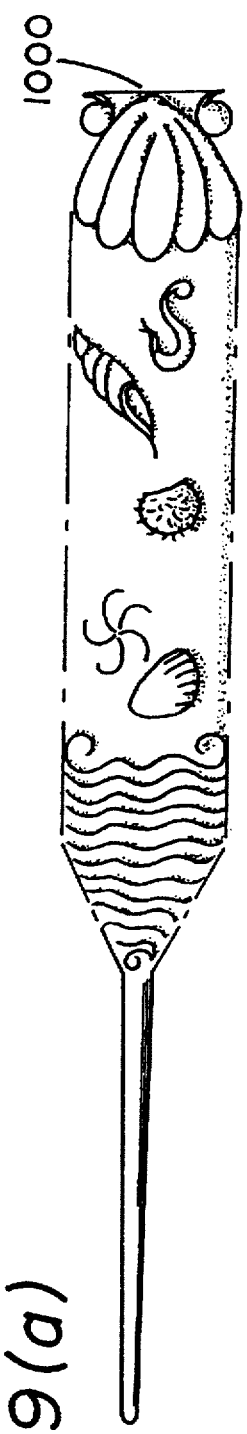
FIGS. 9a, 9b and 9c illustrate three ornamental designs which can be molded, carved or otherwise graphically imprinted onto the handle portion of the tool.
Figure 9B:
Figure 9C:

FIGS. 9a, 9b and 9c illustrate three ornamental designs 1000, 1010, 1020 which can be molded, carved or otherwise graphically imprinted onto the handle portion of the tool. FIGS. 10a and 10b illustrate two ornamental designs 1030, 1040, which can be molded, carved or otherwise graphically imprinted onto the handle and pincer portions of the tool.

In use, a crab body half is grasped and the tool 100 is inserted into a section or subchamber (e.g. 50) of a crab body half (e.g. 48) to remove the white crab meat. The tool 100 may be inserted into a narrow outer leg opening 30 in such a manner that one jaw 124 is within the crab shell subchamber 50 and the other jaw 224 is outside the crab shell. The crab body half is inverted in the hand and with the other hand, by closing the tool and twisting the tool, one cleanly rips open the shell without contaminating the white meat with bits of shell, since any bits of shell fall downwardly, away from the meat. This creates a large opening in the shell for picking out the crab meat.

The tool 100 can also be used to pull crab meat through the outwardly facing narrow leg holes 30–37. The tool is inserted, with both jaws (biased open), into the leg hole to a depth of at least one inch. This places the jaws on opposite sides of a lump of crab meat which is found within subchamber. Next, the lump of crab meat is grasped with the tool and withdrawn in the tools jaws through the outwardly facing leg hole. Using these techniques, it is possible to pick virtually all of the crab meat without contaminating that meat with bits of shell. The tool 100 may also be used to reach into the legs 14 and backfin 16, thus removing meat which would otherwise be wasted.

It is also possible to open up the difficult sections of the claw 20 using this method. The jaws 124, 224 may be used as a nibbling tool for nibbling away the shell which protects the meat within the claw. Once a large enough opening has been made in the claw, the meat within the claw may be withdrawn whole from it's shell by grasping with the jaws of the tool.

The foregoing describes the preferred embodiments of the present invention along with a number of possible alternatives. A person of ordinary skill in the art will recognize that modifications of the described embodiments may be made without departing from the true spirit and scope of the invention. The invention is, therefore, not restricted to the embodiments disclosed above but is defined in the following claims:

I claim:

1. A forceps tool for picking crabs, comprising:

a left tool portion having a left handle, and a left pincer having a first end connected to a first end of said left handle, said left handle having a length which is equal to or greater than three inches and having a first width, said left pincer having a length equal to or greater than one and one-half inches and having a second width which is narrower than said first width, said left pincer terminating at a second end in a left jaw portion having a third width and a left inside surface;

a right tool portion having a right handle and a right pincer having a first end connected to a first end of said right handle, said right handle having a length and width equal to the length and width of said left handle, and said right pincer having a length and width equal to the length and width of said left pincer, said right pincer terminating in a right jaw portion having a width equal to the width of said left jaw portion and having a right inside surface, said right handle being connected to said left handle at respective second ends of said handles to cause said left handle and pincer to extend parallel to said right handle and pincer, and to bias said left handle and pincer apart from said right handle and pincer with said left inside surface opposed to, and spaced from said right inside surface by a selected distance, said third width being less than said first width and equal to or greater than said second width; and a roughened surface pattern on each of said opposed left and right inside surfaces.

2. The forceps tool of claim 1, wherein said left jaw portion and said right jaw portion are spoon shaped, and wherein said third width is approximately one quarter inch.

3. The forceps tool of claim 1, wherein said third width is approximately one quarter of an inch, said first width is approximately five eighths of an inch and said second width is approximately one eighth of an inch.

4. The forceps tool of claim 1, wherein said third width is approximately one eighth of an inch, said first width is approximately five eighths of an inch and said second width is approximately one eighth of an inch.

5. The forceps tool of claim 1, wherein said left handle and said right handle are each fabricated as a decaying spiral, each having a serpentine handle end, and are intertwined in a serpentine pattern, and said right handle is affixed to said left handle at said serpentine handle ends.

6. The forceps tool of claim 1, wherein said left jaw portion and said right jaw portion are biased open at a chosen distance which is within the range between one eighth of an inch and one quarter of an inch.

7. The forceps tool of claim 1, wherein said left jaw portion and said right jaw portion are curved and include an outer arcuate edge of a first radius and an inner arcuate edge of a second radius which is less than said first radius.

8. The forceps tool of claim 1, wherein said left handle and said right handle have grooves.

9. The crab picking tool of claim 1, wherein each said handle is connected to its respective pincer at a corresponding rigid joint.

10. The crab picking tool of claim 1, wherein each said handle is connected to its respective pincer to form a unitary tool portion.

11. The crab picking tool of claim 10, wherein both said left tool portion and said right tool portion are tapered inwardly from said second ends of said handles to said second ends of said pincers.

12. The crab picking tool of claim 1, further including a textured gripping surface on each of said handles.

13. The crab picking tool of claim 1, wherein said first end of each said handle is tapered inwardly from said first width to said second width.

* * * * *